(12) United States Patent
Amar (10) Patent No.: US 7,953,504 B2
(45) Date of Patent: May 31, 2011

(54) METHOD AND APPARATUS FOR SELECTING AN AUDIO TRACK BASED UPON AUDIO EXCERPTS

(75) Inventor: Renaud Amar, San Mateo, CA (US)

(73) Assignee: Synaptics Incorporated, Santa Clara, CA (US)

( * ) Notice: Subject to any disclaimer, the term of this patent is extended or adjusted under 35 U.S.C. 154(b) by 2147 days.

(21) Appl. No.: 10/845,711

(22) Filed: May 14, 2004

(65) Prior Publication Data

US 2005/0254366 A1 Nov. 17, 2005

(51) Int. Cl.
  G06F 17/00 (2006.01)
  G06F 7/00 (2006.01)
  G06F 17/30 (2006.01)
  G06F 3/16 (2006.01)
(52) U.S. Cl. .............................. 700/94; 707/736; 715/727
(58) Field of Classification Search .................. 700/94; 707/736; 715/727, 716
See application file for complete search history.

(56) References Cited

U.S. PATENT DOCUMENTS

| | | | |
|---|---|---|---|
| 6,370,543 B2 | 4/2002 | Hoffert et al. | |
| 6,430,582 B1 | 8/2002 | Duncombe | |
| 6,551,357 B1 | 4/2003 | Madduri | |
| 2001/0014891 A1 | 8/2001 | Hoffert et al. | |
| 2002/0178410 A1 | 11/2002 | Haitsma et al. | |
| 2002/0188621 A1 | 12/2002 | Flank et al. | |
| 2002/0194197 A1 | 12/2002 | Flank et al. | |
| 2002/0194198 A1 | 12/2002 | Flank et al. | |
| 2002/0194199 A1 | 12/2002 | Flank et al. | |
| 2002/0194200 A1 | 12/2002 | Flank et al. | |
| 2003/0004968 A1 | 1/2003 | Romer et al. | |
| 2003/0009493 A1* | 1/2003 | Parker et al. ............... | 707/500.1 |
| 2003/0037664 A1* | 2/2003 | Comair et al. ............... | 84/609 |
| 2003/0182139 A1 | 9/2003 | Harris et al. | |
| 2004/0055446 A1 | 3/2004 | Robbin et al. | |
| 2005/0091062 A1* | 4/2005 | Burges et al. ............... | 704/273 |

FOREIGN PATENT DOCUMENTS

| | | |
|---|---|---|
| EP | 1148412 A2 | 10/2001 |
| WO | WO0184375 A1 | 11/2001 |
| WO | WO0219147 A1 | 3/2002 |
| WO | WO02065782 A1 | 8/2002 |

OTHER PUBLICATIONS

ID3v2 Developer Information. ID3 Tag Version 2.4.0—Main Structure and Native Frames [online]. M. Nilsson, Nov. 2000 [retrieved on May 10, 2004]. Retrieved from Internet: <URL:www.id3.org/id3v2.4.0>.

Multimedia Software Online, Home: AudioSharing: NewsShark v2.0 [online]. [retrieved on May 11, 2004]. Retrieved from Internet: <URL: mpegx.com/view.php?detail=1222>.

Hit Discovery 1.0,[online]. 2003[retrieved on May 11, 2004], Retrieved from Internet: URL:www.expertunion.com/hitdiscovery.

* cited by examiner

*Primary Examiner* — Curtis Kuntz
*Assistant Examiner* — Jesse A Elbin
(74) *Attorney, Agent, or Firm* — Ingrassia Fisher & Lorenz, P.C.

(57) ABSTRACT

Methods, devices, systems and data structures are provided for selecting an audio track on a digital audio player. A user of a digital media player is able to select a desired audio track by listening to excerpts of various tracks until the desired track is identified. One exemplary technique for selecting a desired audio track accessible by a media player, for example, begins by sequentially providing a number of audio excerpts to the user, with each audio excerpt corresponding to a recognizable portion of an audio track. When the user hears an excerpt of a desired track, an indication is provided and the media player plays the desired audio track. The excerpt may be of any duration and may incorporate any portion of the audio track that is likely to be recognizable by the user.

41 Claims, 3 Drawing Sheets

METHOD AND APPARATUS FOR SELECTING AN AUDIO TRACK BASED UPON AUDIO EXCERPTS

TECHNICAL FIELD

The present invention generally relates to digital audio players, and more particularly relates to systems, devices and methods for selecting a desired audio track on a digital audio player.

BACKGROUND

Digital audio players such as MP3 players, handheld computers and cellular phones with audio capabilities, and similar computing devices have become immensely popular in recent years. Although the number of audio tracks that could be stored on such devices was initially limited (e.g. on the order of a few dozen tracks, at most), more recently audio players have exploited advances in data compression and mass storage technologies, and are now able to store hundreds or even thousands of audio tracks on highly-portable devices. Many audio players now incorporate large-capacity disk drives, for example, that allow the user to store enough audio content for several weeks of continuous non-repetitive playback.

As digital audio players become increasingly capable in terms of processing power and storage capacity, however, users have reported difficulties in identifying and selecting particular desired tracks from the large library of tracks stored on the device. Typically, audio devices are designed to provide convenient and easy-to-use interfaces that allow the user to search and retrieve tracks for playback using lists of artist names, song titles, or other textual criteria presented on a display screen. In practice, however, searching for a particular track from lists of more than a few tens of tracks can often be a long and tedious process. The user's search is complicated by the small size of most display screens found on digital audio players, which are frequently too small to present large amounts of information. Moreover, ability to search for items such as a title or an artist is not helpful to users who do not remember the exact names associated with the desired track. Indeed, the user may not even have a particular track in mind, but may want to simply consider multiple options until something that suits his or her mood in a particular moment is located. Further, using the display screen to search can be annoying or even dangerous in certain situations, such as while driving a car, operating exercise equipment or other machinery, riding a bicycle, or the like.

It is therefore desirable to provide a new technique for easily identifying and selecting desired tracks on a digital audio player. In addition, it is desirable to provide a digital audio player that enables the user to easily identify and select a desired audio track. Furthermore, other desirable features and characteristics will become apparent from the subsequent detailed description and the appended claims, taken in conjunction with the accompanying drawings and this background.

BRIEF SUMMARY

According to various exemplary embodiments, a user of a digital media player is able to select a desired audio track by listening to excerpts of various tracks until the desired track is identified. One exemplary technique for selecting a desired audio track accessible by a media player, for example, begins by sequentially providing a number of audio excerpts to the user, with each audio excerpt corresponding to a recognizable portion of an audio track. When the user hears an excerpt of a desired track, an indication is provided and the media player plays the desired audio track. The excerpt may be of any duration and may incorporate any portion of the audio track that is likely to be recognizable by the listener.

In another aspect, a device for playing a desired audio track for a user suitably includes a storage medium, a memory, an input device and a processor. The storage medium is configured to store the various audio tracks, with the memory configured to store excerpts corresponding to one or more of the audio tracks. The input device receives user inputs and provides corresponding indications of the inputs to the processor, which is configured to sequentially play the excerpts stored in the memory, to receive and decode the indications of the user inputs from the input device to thereby identify a selected excerpt associated with the desired audio track, and to play the audio track associated with the selected excerpt from the storage medium.

Other embodiments relate to systems, methods, devices, data structures and other facets of selecting audio tracks in a digital audio player as set forth in additional detail below.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

According to various exemplary embodiments, a user is able to search for a desired audio track by reviewing excerpts of various tracks until an excerpt associated with the desired track is presented. When the user hears the excerpt of the desired track, the user indicates his or her preference to listen to the desired track. Because the user is able to select the track based upon audio rather than textual data, the track selection process is made more convenient.

In various embodiments, each excerpt is associated with a recognizable portion of an audio track such as a chorus or refrain, song melody or harmony, famous phrase, illustrative lyrical segment, introduction, ending or the like. The excerpt may be manually or automatically determined using a variety of techniques as set forth below. Because the excerpt may be easily recognized, the user is able to quickly scroll through a variety of potential audio track selections to find a desired track in a manner that may be conceptualized as being similar to a radio listener tuning a desired broadcast station by tuning in multiple stations across the radio frequency spectrum until a desired station is identified. These general concepts may be modified and applied in a number of different contexts, as set forth in greater detail below.

Figure 1:
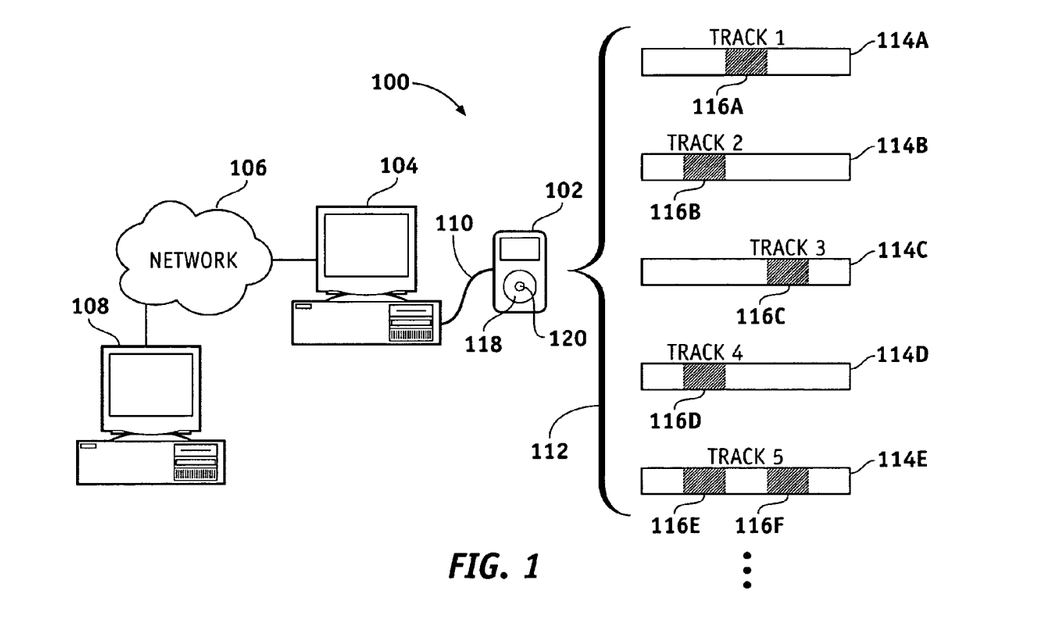
FIG. 1 is a block diagram of an exemplary media player system capable of processing excerpts of audio tracks.

Turning now to the drawing figures and with initial reference to FIG. 1, an exemplary audio file retrieval system 100 suitably includes an audio player 102 that communicates with a personal computer 104 via a data connection 110. Computer 104 is appropriately connected to the internet or another digital network 106 to allow data communications with a remote server 108. Files and/or data obtainable from server 108 may be downloaded to computer 104, which in turn is capable of transferring downloaded data as well as other data stored on or accessible by computer 104 to media player 102 via connection 110. Computer 104 may also operate a management application for obtaining, organizing and/or transferring audio files to media player 102.

Connection 110 may be any serial, parallel or other connection such as a universal serial bus (USB), IEEE 1394 ("Firewire") or other connection. In various embodiments, connection 110 electrically connects computer 104 to a cradle or other docking station capable of receiving media player 102 for improved ease of transfer. Alternatively, connection 110 may be an IEEE 802.3 or other type of wireless connection. The exemplary embodiment of system 100 shown in FIG. 1 is intended solely to facilitate ease of discussion; in practice, media player 102 need not be coupled to computer 104. Rather than communicating through computer 104, for example, media player 102 can alternatively couple directly to server 108 via any type of connection, such as a wired or wireless connection. Files and/or data obtainable from server 108 can be transferred to media player 102 in batch format, in real time or in any other manner. Server 108 may also operate a management application for obtaining, organizing, and/or transferring audio files to media player 102. Server 108 may be implemented as a kiosk or other terminal, for example, that wirelessly or otherwise provides audio files to media player 102 in an airport, nightclub, restaurant, coffee shop, hotel, retail store, office or other environment. Computer 104, network 106, server 108 and connection 110 are therefore intended as optional components that are present only in exemplary embodiments.

Media player 102 is any device, software application and/or processing module capable of playing or otherwise providing digital audio content to a listener/user. Examples of digital media player devices include the IPOD players available from Apple Computer Corp. of Cupertino, Calif., the NOMAD players available from Creative Technology Inc. of the Republic of Singapore, and various cell phones, handheld computers, PDAs, and combination devices capable of providing audio content, although the concepts described herein may be readily applied to any digital medial player operating on data stored in any format. Although digital audio players based upon the MPEG layer three (MP3) format are presently very popular, alternate media players process content stored in any other format or scheme such as Windows media format (WMA), audio waveform (WAV) format, Apple audio content (ACC) and/or any other format presently available or subsequently developed.

Media player 102 typically provides data storage, input/output functionality and decoder processing for audio files, as described more fully below. In the exemplary embodiment of FIG. 1, media player 102 is shown with a navigation input device 118 (e.g. a touch-sensitive wheel or mechanical wheel, although equivalent functionality could be provided by a slider, touchpad, rocker switch, one or more buttons, and/or the like) and a selecting input device 120 (e.g. a button). In other embodiments, navigation and selecting functions may be controlled by a common input device (e.g. any of the input devices described herein). The concepts described herein may be equivalently applied to software embodiments of media players 102 executing in any computing language or environment. Examples of software digital media players include the WINAMP player available from Nullsoft Inc. of San Francisco, Calif.; the Windows Media Player program available from Microsoft Corp. of Redmond, Wash.; and the iTunes media player available from Apple Corp.

Media player 102 can suitably maintain a media library, listing or other repository 112 of digital audio tracks 114A-E (each generally referred to as a track 114). Although FIG. 1 shows media library 112 as having five tracks 114A-E, any number of tracks may be present in a practical implementation. Indeed, many embodiments will have tens, hundreds, thousands or more tracks stored within library 112. Each track may correspond to a song, reading passage, poem or other representation of spoken word, musical or other audio content. Typically, each track 114 is stored as a separate data file in a pre-defined format (e.g. MP3, WMA, ACC or other format as described above).

In various embodiments, some or all of the tracks 114 suitably include one or more "excerpts" 116A-F (each generally referred to as an excerpt 116) that correspond to recognizable portions of the tracks. Excerpts 116 may be identified as "tags" or other information contained within header information associated with tracks 114. Data identifying the various excerpts 116 may be obtained from a remote server 108, for example, and/or may be computed or manually entered at computer 104 or audio player 102. Rather than (or in addition to) the user identifying tracks by scrolling and/or otherwise navigating through textual lists or other visual presentations of audio tracks 114, media player 102 suitably allows the user to listen to audio excerpts 116 associated with the various tracks 114 to identify a desired track. As the user manipulates navigation input 118, excerpts 116 are played until the user indicates that the desired track has been located (e.g. by depressing selecting input button 120). Alternatively, player 102 may be placed in a "scan" mode that automatically cycles the excerpts without further input from the user. The general concept of searching based upon audio excerpts 116 may be readily modified and/or enhanced in a myriad of ways, as described more fully below. In an alternate embodiment, at least a portion of tracks 114 and/or excerpts 116 is stored in remote server 108 or computer 104, and transferred to media player 102 in batches or in real-time for presentation to the user.

Figure 2:
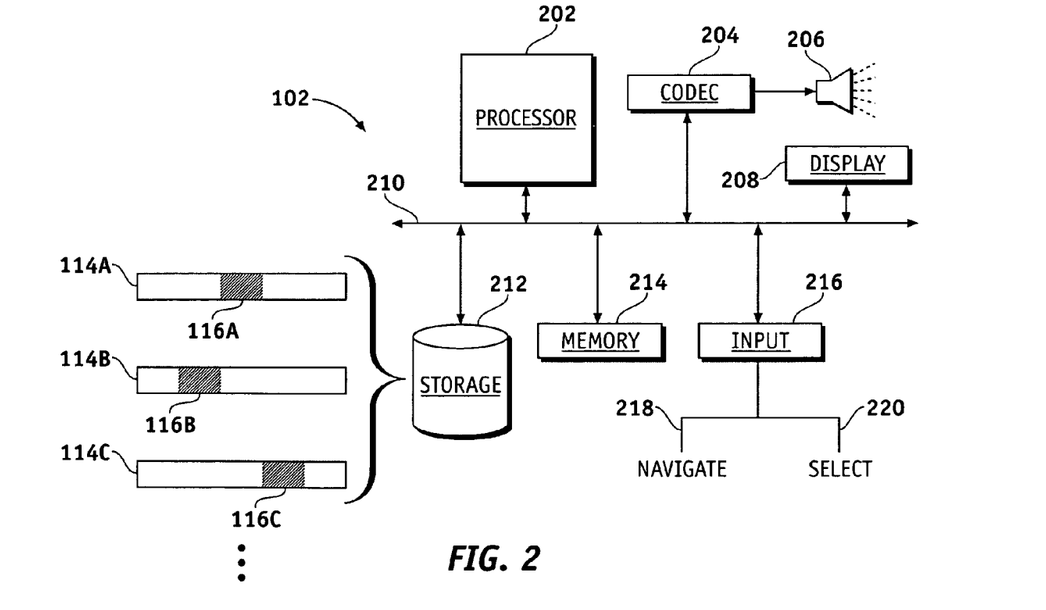
FIG. 2 is a block diagram of an exemplary media player device.

With reference now to FIG. 2, an exemplary media player 102 suitably includes a processor 202 communicating with an input device 216, a mass storage device 212, a display 208, an audio decoder (codec) 204 and a memory 214. Although FIG. 2 shows these various components of media player 102 and the components communicating over a bus 210, FIG. 2 is intended as a logical model rather than a physical representation of actual components. Practical implementations may be therefore configured in any manner, using any architecture or other layout. Processor 202 may receive input directly from input device 216, for example, and the various functions of processor 202 and codec 204 may be combined in any manner. In addition, multiple logical model components may be realized physically in a single component, for example, or a single logical model component may be realized in multiple physical components, Processor 202 suitably executes instructions stored in memory 214 or elsewhere to execute the various functions of media player 102. Library 112 of audio tracks 114, if stored in media player 102, is appropriately stored in a hard drive, memory or other mass storage device 212 for subsequent retrieval and playback by codec 204. Processor 202 can direct media player 102 to provide auditory, kinesthetic, and/or visual interfaces to the user for selecting and playing desired audio tracks 114 stored on storage device 212. To this end, processor 202 suitably receives user input signals from input device 216 and processes the input signals to produce desired results with display 208 and/or codec 204. Input signals may include a navigation signal 218 obtained from navigation device 118 (FIG. 1) and/or a selecting signal 220 obtained from selecting device 120 (FIG. 1), although any other inputs may be provided in a wide array of alternate embodiments. Codec 204 suitably decodes, decompresses and/or otherwise processes the various audio tracks 114 to provide appropriate audio signals to drive speaker 206, which may or may not be incorporated within audio player 102.

Memory 214 is any digital or other data storage device capable of maintaining instructions and/or data for retrieval by processor 202 and/or other components. Memory 214 may include any static or dynamic random access memory (RAM), for example, and/or may include read only memory (ROM), flash memory, magnetic or optical RAM, or any other data storage technologies or techniques. In various embodiments, memory 214 maintains software instructions that are executable by processor 202 to carry out the various search, retrieval, interface and playback functions of media player 102. Memory 214 may additionally or alternatively include a memory cache to provide rapid access to data and instructions processed by processor 202.

Figure 3:
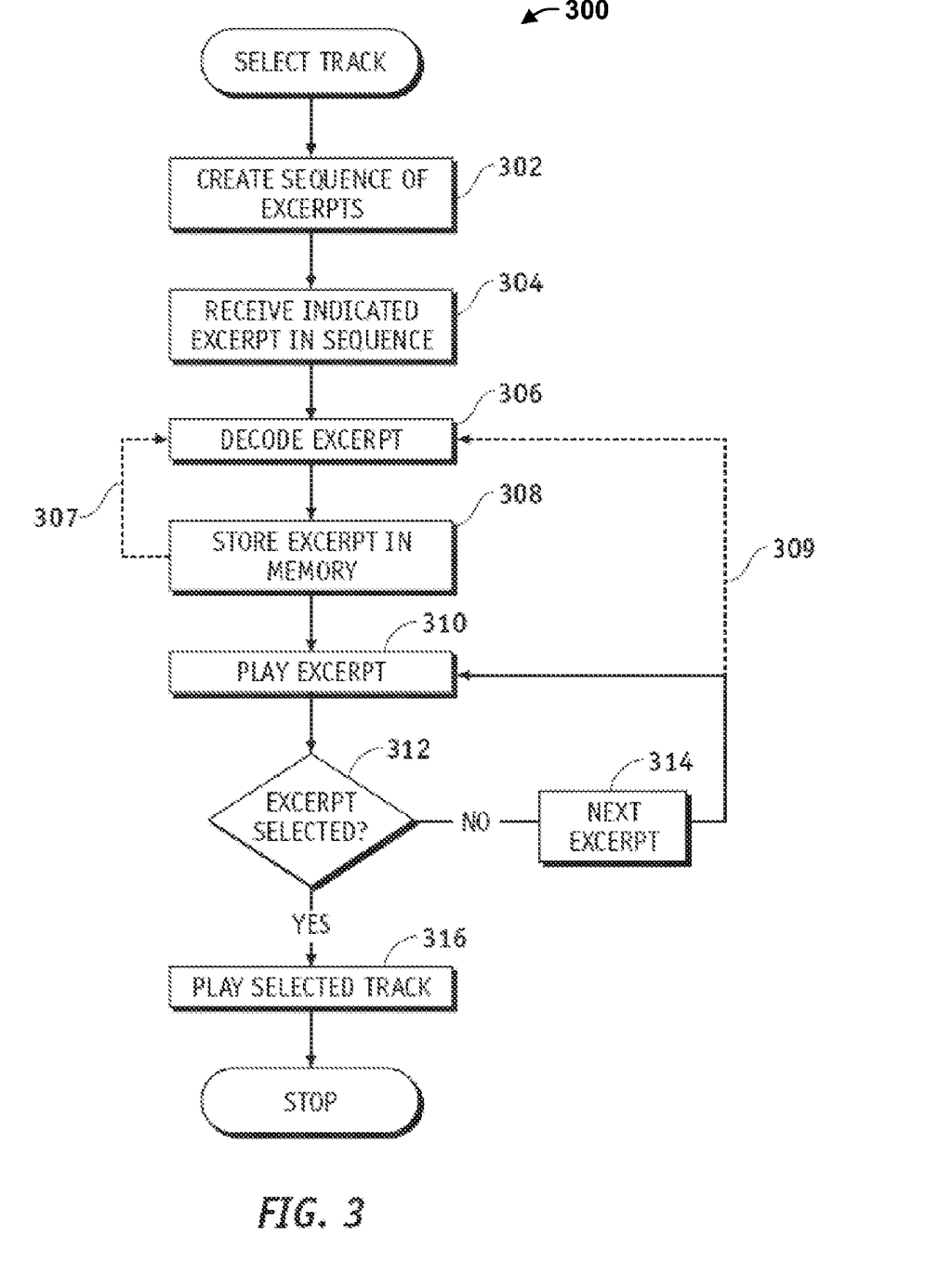
FIG. 3 is a flowchart of an exemplary process for selecting a desired audio track using audio excerpts.

With reference now to FIG. 3, an exemplary method 300 for selecting an audio track 114 based upon audio excerpts 116 suitably includes the broad steps of sequentially providing any number of audio excerpts 116 (step 310), receiving an indication of a selected audio excerpt 114 associated with a desired audio track 112 (step 312), and playing the desired audio track 114 on media player 102 (step 316). In various further embodiments, the excerpts 116 are sequenced (step 302), decoded (step 306), and/or stored in memory 214 (step 308) as appropriate. The various steps and components of method 300 may be implemented by processor 202 with software instructions stored in memory 214 or elsewhere in media player 102. Alternatively, some or all of the steps may be manually executed by the user in a wide array of equivalent embodiments.

Exemplary method 300 as shown in FIG. 3 suitably begins by creating a sequence of excerpts 116 to be provided to the user (step 302). The sequence may be initiated in any manner, such as by a user manually entering an "excerpt mode" using input device 216 or through an automatic or default setting of media player 102. Excerpts 116 may be logically arranged in any order. Excerpts 116 may be arranged alphanumerically, such as alphabetically or in a similar manner associated with the language used (e.g. by title, composer, performer, album name or the like), according to playback parameters (e.g. most recently played, most recently uploaded, most frequently played, etc.), according to user preferences (e.g. previous user heuristics, predictions by user-trained neural networks or expert systems, playlists or customized lists) and/or according to any other scheme. This processing is typically executed by processor 202, which suitably creates a linked list, array or other data structure representing the desired sequence in memory 214. Alternatively, the sequence may be created on computer 104 (FIG. 1) and transferred to media player 102 via connection 110 or on server 108 and transferred to media player 102 via an electronic connection. Step 302 need not be executed upon each iteration of method 300. Indeed, the linked list or other data structure representing the sequence may be stored in memory 214, in storage medium 212, on computer 104, on server 108, and/or in any other location for retrieval during subsequent iterations of method 300.

After the sequence of excerpts is created, one of the excerpts 116 in the sequence is indicated as the first to be played for the user (step 304). This indicated excerpt may initially correspond to the first excerpt in the sequence, an excerpt identified through user inputs, a random excerpt, or any other excerpt. This indicated excerpt is the first to be played for the user/listener, as described more fully below.

When one or more excerpts 116 are sequenced and indicated as appropriate, one or more excerpts are suitably decoded (step 306) and placed in memory 214 (step 308) for subsequent playback. Excerpts 116 may be decoded in any manner. In various embodiments, each excerpt 116 is determined by examination of the audio track for characteristics described more fully below. In other embodiments, each excerpt 116 is described in "meta data" stored in a header associated with the audio track 114, as described more fully below. The header may include an indication of a starting point for the excerpt, as well as an ending point and/or duration of the excerpt. Alternatively, each excerpt 116 may run until the end of the associated track 114, or be of a fixed duration, such that a starting point is sufficient to describe the entire excerpt.

The portion of the audio track 114 corresponding to the indicated excerpt 116 is therefore extracted from storage medium 212 and stored in memory 214 for rapid playback. Decoding step 306 may also include decompressing or otherwise preparing the excerpt data for playback. Alternatively, decompression and playback decoding may be separately processed by codec 204 or another component during step 316 below.

In various embodiments, multiple excerpts 116 are stored within memory 214 to allow rapid navigation by the user. Although not required in all implementations, the decoding and storing process for two or more excerpts may take place in a batch processing manner prior to or during playback of an excerpt 116 as shown by dotted arrow 307 in FIG. 3. In this manner, a subset of the excerpts 116 stored in storage medium 212 can be readily loaded into memory 214 for rapid retrieval and playback of multiple excerpts 116, thereby improving access times for audio navigation. Alternatively, excerpts 116 may be retrieved as needed from storage medium 212 through any serial, parallel or batch process in any manner. In an exemplary embodiment, excerpts 116 located just prior to and/or just after the indicated excerpt 116 in the sequence created in step 302 are stored in memory 214 to facilitate rapid backward and forward navigation, respectively.

Excerpts 116 are then played (step 310) for the listener. As noted above, excerpt 116 suitably corresponds to a portion of an audio track 114 that is likely to be recognized. The user is therefore able to identify the track 114 based upon the corresponding excerpt 116. Playback can take place in any manner. In an exemplary embodiment, data for the excerpts 116 to be played is retrieved from memory 214 and provided to codec 204 for decoding and playback in a manner similar to that used for playback of audio tracks 114.

The user searches for a desired audio track 114 by navigating through the sequence to update the excerpt 116 being played. In various embodiments, the user is able to scroll forward and/or backward in the sequence through inputs provided at navigation input device 118 (FIG. 1), selecting input 120 (FIG. 1) and/or other input devices 216 (FIG. 2). In such embodiments, a user may scroll forward and/or backward through the various audio excerpts 116 stored in memory 214 in a manner similar to a user navigating through a textual list or visual presentation, but with navigation instructions resulting in changes in audio feedback rather than (or in addition to) changes on a visual display. Media player 102 may also provide the user with the ability to manipulate the audio presentation of the audio excerpt being played; for example, media player 102 can provide faster or slower playback of the same excerpt in response to navigation instructions, or media player 102 can provide the user with the ability to scroll backwards or forwards through the same excerpt in response to navigation instructions. Alternatively, after an excerpt 116 has been played for a desired period of time (e.g. on the order of a few seconds or so) and/or as the excerpt 116 comes to a close, media player 102 automatically advances to the next excerpt 116 in the sequence. Accordingly, media player 102 appropriately advances through the sequence of excerpts 116 in a forward and/or backward direction in response to user input. Alternatively or additionally, media player 102 advances through the sequence of excerpts 116 automatically if no user input is received from the user.

As the user scrolls through the sequence of excerpts 116 (step 314), each excerpt 116 may be sequentially played back to the user in any manner. In embodiments wherein multiple excerpts 116 are stored in cache memory 214 prior to navigation, each excerpt 116 can quickly transition to the next excerpt due to the rapid accessibility of memory 214. In a further embodiment, the user experience may be enhanced by providing transitional sounds or audio or visual effects between audio excerpts 116. Transitional sounds may simulate the noise and distortion heard when tuning an AM, FM or shortwave radio, for example, or may provide any other effect. Alternatively, transitional audio effects such as cross-fading one of the excerpts 116 into another could be provided. Other effects could include modifying the tempo of one or more excerpts to provide "beat matching", musical key transposition or other effects. Other audio effects and/or transitional sounds may be provided in a wide array of alternate embodiments.

As the user scrolls between the various excerpts 116, the excerpts stored in memory 214 may be deleted, supplemented and/or otherwise updated as appropriate (as indicated by dotted arrow 309 in FIG. 3) to allow further navigation by the user. In an exemplary embodiment, media player 102 maintains a "buffer" of excerpts 116 prior and after the currently-played excerpt 116. Such a "buffer" may include ten or more excerpts 116, for example, or any other number of excerpts, that are stored in memory 214 to ensure rapid navigation. As one of the excerpts 116 moves outside of the "buffer" region, that excerpt 116 may be deleted from memory 214 and/or replaced by another excerpt 116 that is within the updated navigation range of the user.

When the user hears an excerpt 116 corresponding to a desired audio track 114 in step 310, a stimulus may be provided to input device 216 to thereby select the current excerpt (step 312). This selection may take place in any manner. In an exemplary embodiment, the user depresses selection input button 120 (FIG. 1) to select the currently-played excerpt 116. Alternatively, an excerpt may be automatically selected according to appropriate criteria (e.g. end of the sequence encountered, lack of user response for a period of time, etc.).

As the currently-played excerpt 116 is selected by the user, the corresponding audio track 114 is retrieved from storage medium 212 and provided to codec 204 for playback in any manner (step 316). Playback may be initiated from the beginning of the audio track 114, from the beginning of the associated excerpt 116 and/or from any other location in audio track 114. Alternatively, playback may continue from the point in excerpt 116 when the user selected the track to thereby provide listening continuity for the user.

Accordingly, the user is able to select a desired track 114 from the library of tracks stored on media player 102 (or elsewhere accessible by media player 102) by navigating through a sequence of excerpts 116. Navigation may take place automatically and/or in response to user inputs, as appropriate. When the user hears an excerpt 116 corresponding to a desired track 114, the user selects the excerpt 116 and the desired track 114 is played. While FIG. 3 shows one embodiment of a track selection method 300, alternate but equivalent embodiments may incorporate only portions of method 300, may execute the various steps of method 300 in any other temporal manner, and/or may enhance the steps shown in the figure in any manner whatsoever.

Figure 4:
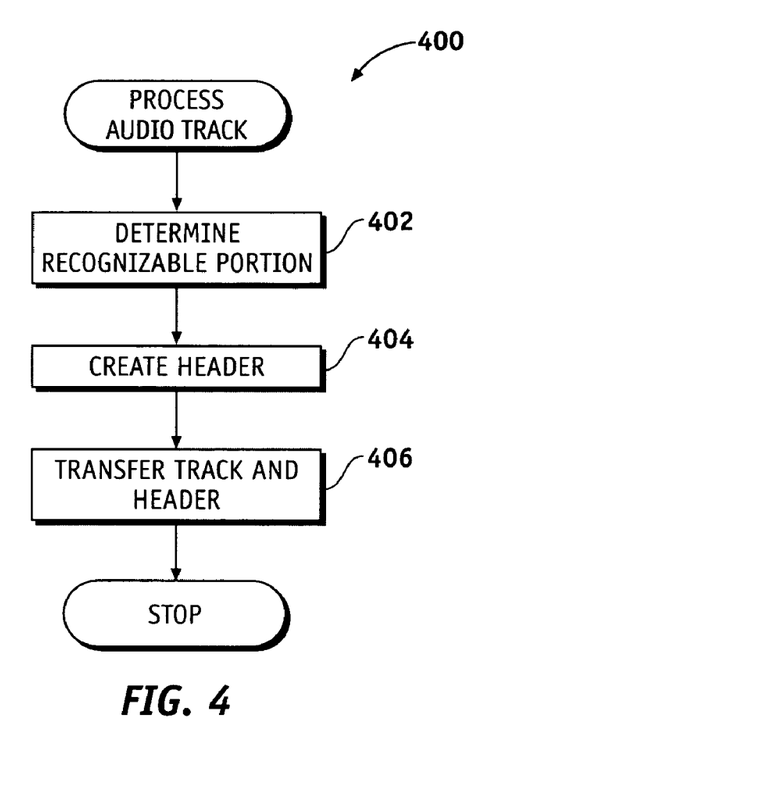
FIG. 4 is a flowchart of an exemplary process for transferring an audio track with a header to a media player.

With reference now to FIG. 4, an exemplary method 400 of transferring an audio track 114 with a header from a host to a media player 102 suitably includes the broad steps of identifying a recognizable portion of the track for the excerpt (step 402), creating a header to describe the excerpt (step 404) and transferring the track to media player 102 (step 406) as appropriate. The "host" in this case may refer to computer 104 (FIG. 1), server 108 (FIG. 1) and/or any other data processing system capable of providing audio data to media player 102.

Excerpts 116 may be created according to any technique. In various embodiments, excerpts 116 correspond to recognizable portions of audio tracks 114. "Recognizable portions" may be determined in any manual or automatic manner (step 402), and may be determined as any appropriate portion of audio track 114. Musical works, for example, may have particularly famous or distinctive passages that can be easily recognized by the user. Such passages may include a song chorus, for example, or another repeated lyrical and/or musical pattern. Spoken word tracks and other audio tracks 114 may be similarly recognized by famous or memorable passages, thereby allowing excerpts 116 to be created from these passages. Several techniques for identifying recognizable portions of audio tracks 114 are described below.

In various embodiments (and with momentary reference to FIG. 1), recognizable portions of songs are indicated manually by user inputs provided to computer 104 and/or media player 102. A user may depress selection input 120 as an audio track 114 is playing, for example, to indicate excerpt starting and/or ending points. Such descriptions of recognizable portions may be shared with others on a free or fee-based basis via a server 108 on a digital network 106, via communications between media players 102, or through any other technique. Conversely, data describing the recognizable portions may be obtained from a networked server 108, either alone or in conjunction with the audio track 114 itself.

Alternatively (or additionally), recognizable portions may be determined automatically by audio player 102, computer 104 and/or server 108. Exemplary techniques for automatically determining a recognizable portion of an audio track 114 include identifying patterns in the bit stream, evaluating the data compression or other encoding performed or performable on audio track 114, and/or performing spectral analysis of the track's contents. Each of the audio tracks 114 is typically provided as a stream or collection of digital bits. These bits may be analyzed, for example, to determine repetitive patterns that may correspond to repeated sections of audio track 114. Similarly, the encoded contents of the audio track may be digitally processed to identify repeating portions of music, lyrics or other content. The repetitive patterns identified in the bitstream and/or in the track contents may be further temporally constrained to ensure that repetitive patterns identified are truly recognizable portions. Temporal constraints may include criteria to eliminate undesired repetitive patterns that would otherwise be confused with desirable recognizable portions. Such criteria could include a requirement that a potentially recognizable pattern have a minimum duration (e.g. several seconds or so), for example, and/or that the pattern repeat only after several seconds (or some other appropriate period of time) have elapsed. Such constraints may be useful in separating drum beats and other very repetitive portions in musical compositions, for example, from other patterns of greater interest.

Another technique for automatically determining recognizable portions involves performing a frequency spectrum analysis of the audio track using conventional Fourier analysis techniques or the like. By analyzing the spectrum of audio track 114 and applying appropriate selection criteria, portions of interest such as the portion with the broadest instantaneous frequency spectrum, the greatest volume relative to the rest of the track, or the like. Spectral analysis may also be used to identify repeating portions, and may optionally incorporate the temporal restraints described above.

Further, the compressibility or encoding of audio track 114 itself may be a source of information in identifying a recognizable portion. By determining the amount of compression applied or applicable to various portions of track 114, for example, the density of information contained in various portions of the data file can be observed, compared to other portions and correlated to a portion of audio track 114. The portions of track 114 with the greatest information density (typically corresponding to the portions with the least data compression) may be the sections with the greatest dynamic levels, which in turn may correspond to recognizable portions.

Again, recognizable portions of audio tracks 114 may be obtained in any manual and/or automatic manner. The recognizable portions need not conform to the initial portions of track 114, and indeed may be most recognizable when distinct from the initial portion of track 114. Although typically described herein as having only a single excerpt 116, each track 114 may in fact have any number of recognizable portions, with each portion corresponding to a separate excerpt 116. That is, some tracks 114 may not include excerpt functionality at all, whereas other tracks 114 may have two or more recognizable portions. In such cases, multiple recognizable portions may be combined into one or more excerpts 116, and/or the various portions may be processed as separate excerpts 116 as appropriate.

Referring again to FIG. 4, excerpt data may be readily incorporated into a header associated with the audio track 114 (step 404) such that the excerpt description is transferred in conjunction with the track itself. Generally speaking, excerpts 116 may be of fixed or variable time duration. In the former case, only a single time point in audio track 114 may be used to define the associated excerpt 116, since the ending point can be determined from the starting point and the fixed duration, or indeed the ending point could default to a particular point (e.g. the end) of audio track 114. Alternatively, an excerpt 116 having a variable time duration can be described by a starting point and an ending point, a time duration and/or a default ending point (e.g. the end of audio track 114). With this data, media player 102 is appropriately able to determine the excerpt 116 without requiring a separate file or other information as described in conjunction with step 306 (FIG. 3) above. Moreover, excerpt data may be readily incorporated into the header of the audio track data file, therefore allowing the excerpt 116 to be transferred as part of the audio track 114 itself. Additional data about data headers and files is presented below in conjunction with FIG. 5.

Audio tracks 114 with associated excerpt information are transferred to media player 102 in any manner (step 406). In an exemplary embodiment, excerpt data is stored in a header that is part of the audio track file as described above and below. Data transfers to media player 102 may take place over connection 110 (FIG. 1), or may take place via any wired or wireless data connection as appropriate.

Excerpt data may therefore be created in any manner to identify recognizable portions of audio tracks 114. The excerpt data is appropriately stored in a header for each audio track 114 such that the complete digital file, which includes the track 114 as well as the header, can be transferred to media player 102 as appropriate. In alternate embodiments, media player 102 contains sufficient onboard processing to manage automatic and/or manual excerpt determination. In such embodiments, step 406 may be eliminated or modified as appropriate.

Figure 5:
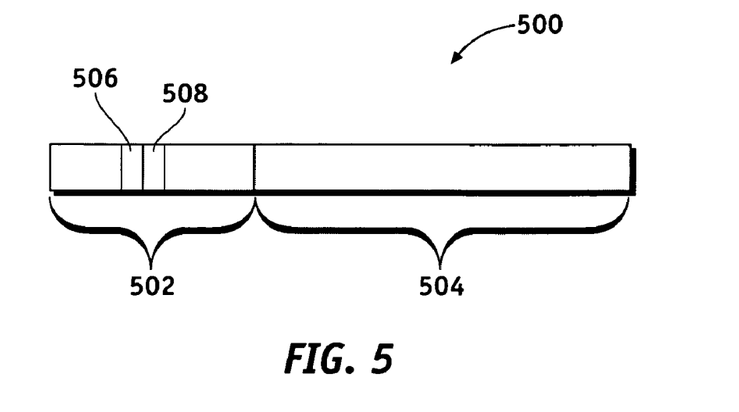
FIG. 5 is a block diagram of an exemplary data structure for an audio track including a data field and a header field.

Turing now to FIG. 5, an exemplary data structure 500 for an audio track 114 with a header suitably includes a header portion 502 and a data portion 504. Header portion 502 contains "meta data" about data portion 504 and/or data stored therein. Typically header portion 502 is pre-pended to data portion 504 to create a combined data file 500 that can be readily transferred from device to device or application to application. In an exemplary embodiment suitable for use with audio files 500 in MP3 format, header 502 may be implemented using the ID3v2 tagging system that allows enriching information about audio files to be stored in data "frames". Information that can be stored within ID3 frames includes artist names, track names, album titles, lyrics and the like. By simply creating additional frames for excerpt information, this data may be readily added to a multitude of existing MP3 files without significant modification of the file. As briefly discussed above, in embodiments wherein the excerpt 116 has a fixed duration or when excerpt 116 is run until the end of track 114, an excerpt starting point field 506 is sufficient to allow media player 102 to decode the excerpt 116. In embodiments wherein the excerpt 116 has a variable duration, a starting point field 506 and an ending point field 508 may be used to define the excerpt 116. Starting point field 506 may reference the beginning of the recognizable portion in any manner, such as by providing the number of seconds (or microseconds, minutes or some combination of temporal values) from the beginning of audio track 114 to the start of the recognizable portion. Such a value may typically be represented by a one or two byte binary number, although other embodiments may use other representations and may occupy any amount of data storage. Similarly, ending point field 508 may store an absolute reference to the end of the recognizable portion in any format, including a one or two byte binary representation. The ending point may be expressed with reference to any appropriate point in audio track 114, such as the beginning of track 114, the beginning of the recognizable portion, or any other suitable reference point.

With reference again to FIG. 1, users are provided with a new technique for selecting audio tracks based upon audio excerpts. These excerpts are appropriately selected from recognizable portions of the audio tracks, and are played for the user in sequence. The user is able to manually or automatically scroll through the excerpts to listen to the various recognizable portions, thereby allowing the user to select a track based upon audible information. Because the user is no longer constrained by textual displays, track titles and other visual information, the convenience and safety of the device is greatly improved while providing enhanced functionality to the user.

While at least one exemplary embodiment has been presented in the foregoing detailed description, it should be appreciated that a vast number of equivalent variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing exemplary embodiments, it being understood that various changes may be made in the function and arrangement of elements described without departing from the scope of the invention as set forth in the appended claims and their legal equivalents.

What is claimed is:

1. A method of selecting a desired one of a plurality of audio tracks accessible by a media player, the method comprising the steps of:
   sequentially providing a plurality of audio excerpts, wherein each of the plurality of audio excerpts corresponds to a recognizable portion of one of the plurality of audio tracks;
   loading a subset of the plurality of audio excerpts in a memory; and
   modifying the subset of the plurality of audio excerpts loaded in the memory while providing at least a portion of the plurality of audio excerpts;
   receiving an indication of a selected one of the plurality of audio excerpts associated with the desired audio track; and
   playing the desired one of the plurality of audio tracks on the media player.

2. The method of claim 1 wherein the providing step comprises sequencing at least a portion of the plurality of audio excerpts into an order.

3. The method of claim 2 wherein the order is arranged according to a title of the audio track.

4. The method of claim 2 wherein the order is arranged according to an artist name for the audio track.

5. The method of claim 2 wherein the order is arranged according to a playback frequency of the audio track.

6. The method of claim 2 wherein the order is arranged according to a function of most-recently played audio tracks.

7. The method of claim 2 wherein the order corresponds to a human-defined playlist.

8. The method of claim 2 wherein the providing step further comprises advancing through the order in response to a user input.

9. The method of claim 8 wherein the advancing step comprises advancing in a forward direction through the order.

10. The method of claim 8 wherein the advancing step comprises advancing in a backward direction through the order.

11. The method of claim 8 further comprising the step of automatically advancing to a subsequent audio excerpt in the order if no user input is received.

12. The method of claim 2 wherein the providing step further comprises automatically advancing to a subsequent audio excerpt in the order if no user input is received.

13. The method of claim 1 wherein the providing step comprises cross-fading one of the plurality of audio excerpts into another of the plurality of audio excerpts.

14. The method of claim 1 wherein the providing step comprises providing a transitional sound between the audio excerpts.

15. The method of claim 14 wherein the transitional sound is configured to simulate the sound of tuning a radio.

16. The method of claim 1 wherein the playing step comprises playing the desired audio track from a beginning of the desired audio track.

17. The method of claim 1 wherein the playing step comprises playing the desired audio track from the recognizable portion corresponding to the selected audio excerpt.

18. The method of claim 1 wherein at least one of the plurality of audio excerpts corresponds to a repeated portion of the desired audio track.

19. The method of claim 18 wherein a repetition of the repeated portion in the desired audio track is temporally constrained.

20. The method of claim 18 wherein the at least one of the plurality of audio excerpts corresponds to a chorus section of the desired audio track.

21. The method of claim 1 wherein at least one of the plurality of audio excerpts corresponds to a portion of the desired audio track having the broadest instantaneous frequency spectrum.

22. The method of claim 1 wherein at least one of the plurality of audio excerpts corresponds to a portion of the desired audio track having the highest relative volume.

23. The method of claim 1 wherein at least one of the plurality of audio excerpts is distinct from the initial portion of the desired audio track.

24. The method of claim 1 wherein at least one of the plurality of audio excerpts is obtained from a remote server.

25. The method of claim 1 wherein the desired audio track is obtained from a remote server.

26. The method of claim 1 wherein the providing step comprises the step of decoding a header associated with one of the plurality of audio tracks to determine the audio excerpt of the audio track.

27. The method of claim 26 wherein the decoding step comprises determining a start point in the audio track for the audio excerpt.

28. The method of claim 26 wherein the decoding step comprises determining a duration for the audio excerpt.

29. The method of claim 26 wherein the decoding step comprises determining an end point for the audio excerpt.

30. The method of claim 1 wherein at least one of the plurality of audio tracks corresponds to at least two of the plurality of audio excerpts.

31. A digital storage medium having computer-executable instructions stored thereon, wherein the instructions are configured to execute the method of claim 1.

32. A device for playing a desired one of a plurality of audio tracks for a user, the device comprising:
   a storage medium configured to store the plurality of audio tracks;
   a memory configured to store a plurality of excerpts, wherein each of the plurality of excerpts corresponds to one of the plurality of audio tracks;
   an input device configured to receive a user input and to provide a corresponding indication of the user input; and
   a processor configured to sequentially play the plurality of excerpts stored in the memory, to receive and decode the indication of the user input from the input device to thereby identify a selected excerpt from the plurality of excerpts that is associated with the desired one of the plurality of audio tracks, and to play the desired one of the plurality of audio tracks associated with the selected excerpt from the storage medium;
   the processor further configured to load a subset of the plurality of audio excerpts in the memory and modify the subset of the plurality of audio excerpts loaded in the memory while providing at least a portion of the plurality of audio excerpts.

33. The device of claim 32 wherein each of the plurality of excerpts corresponds to a recognizable portion of the corresponding audio track.

34. The device of claim 32 wherein at least one of the plurality of excerpts is distinct from the first portion of the corresponding audio track.

35. The device of claim 32 wherein the input device is a touch-sensitive device.

36. The device of claim 32 wherein the input device comprises a capacitive proximity sensor.

37. The device of claim 32 wherein the input device comprises a button.

38. The device of claim 32 further comprising an interface to a host computer.

39. The device of claim 38 wherein the processor is further configured to communicate with the host computer via the interface to transfer the plurality of audio tracks from the host computer to the storage medium.

40. The device of claim 38 wherein the processor is further configured to communicate with the host computer via the interface to transfer the plurality of audio excerpts from the host computer to the storage medium.

41. A device for playing a desired one of a plurality of audio tracks for a user, the device comprising:
    means for storing the plurality of audio tracks;
    means for storing a plurality of excerpts, wherein each of the excerpts comprises a recognizable portion of one of the plurality of audio tracks that is associated with the excerpt;
    means for sequentially playing the plurality of excerpts for the user;
    means for receiving an indication from the user of a selected excerpt associated with the desired audio track;
    means for playing the desired audio track associated with the selected excerpt for the user; and
    means for modifying a subset of the plurality of audio excerpts while providing at least a portion of the plurality of audio excerpts.

* * * * *